United States Patent
Kiyuna (10) Patent No.: US 9,582,897 B2
(45) Date of Patent: Feb. 28, 2017

(54) LIFEFORM IMAGE ANALYSIS SYSTEM, LIFEFORM IMAGE ANALYSIS METHOD, AND LIFEFORM IMAGE ANALYSIS PROGRAM

(71) Applicant: NEC Corporation, Tokyo (JP)

(72) Inventor: Tomoharu Kiyuna, Tokyo (JP)

(73) Assignee: NEC Corporation, Tokyo (JP)

( * ) Notice: Subject to any disclaimer, the term of this patent is extended or adjusted under 35 U.S.C. 154(b) by 13 days.

(21) Appl. No.: 14/377,581

(22) PCT Filed: Jan. 23, 2013

(86) PCT No.: PCT/JP2013/000307
§ 371 (c)(1),
(2) Date: Aug. 8, 2014

(87) PCT Pub. No.: WO2013/118436
PCT Pub. Date: Aug. 15, 2013

(65) Prior Publication Data
US 2015/0023592 A1    Jan. 22, 2015

(30) Foreign Application Priority Data
Feb. 9, 2012  (JP) ................................ 2012-026066

(51) Int. Cl.
G06K 9/00   (2006.01)
G06T 7/40   (2006.01)
(Continued)

(52) U.S. Cl.
CPC ............ *G06T 7/408* (2013.01); *G06K 9/0014* (2013.01); *G06K 9/4652* (2013.01);
(Continued)

(58) Field of Classification Search
CPC .. G06K 9/00; G06K 9/00127; G06K 9/00147; G06K 2209/05; G06T 7/0012;
(Continued)

(56) References Cited

U.S. PATENT DOCUMENTS 9,014,443 B2 *  4/2015  Marugame ................ G06T 3/40
                                                 382/128
2005/0276457 A1  12/2005  Hamer et al.
2013/0011036 A1 *  1/2013  Marugame ............... H04N 1/60
                                                 382/128

FOREIGN PATENT DOCUMENTS

JP      7-198714     8/1995
JP      2003-116593  4/2003
(Continued)

OTHER PUBLICATIONS

International Search Report and Written Opinion of ISA mailed May 14, 2013.

*Primary Examiner* — Jose Couso
(74) *Attorney, Agent, or Firm* — Finnegan, Henderson, Farabow, Garrett & Dunner LLP (57) ABSTRACT

A image input means 81 inputs a lifeform image which is a captured image of a lifeform sample. A structure standard color storage means 82 stores a standard color of a structure included in the lifeform image. A structure extraction means 83 extracts a target structure from the lifeform image. A structure color computation means 84 computes, from an image of the structure extracted by the structure extraction means 83, a color of the structure. A color distribution conversion means 85 converts a color distribution of the input lifeform image so that a difference between the color of the structure computed by the structure color computation means 84 and the standard color of the corresponding structure stored in the structure standard color storage means 82 is reduced.

13 Claims, 9 Drawing Sheets

(51) Int. Cl.
*G06T 7/00* (2006.01)
*G06K 9/46* (2006.01)

(52) U.S. Cl.
CPC .......... *G06T 7/0012* (2013.01); *G06T 7/0081* (2013.01); *G06T 2207/10024* (2013.01); *G06T 2207/30004* (2013.01); *G06T 2207/30024* (2013.01)

(58) Field of Classification Search
CPC ..... G06T 7/0014; G06T 7/0081; G06T 7/408; G06T 7/602; G06T 2207/30024; H04N 1/4072; H04N 1/60; Y10S 128/922; G06F 19/345
See application file for complete search history.

(56) References Cited

FOREIGN PATENT DOCUMENTS

| | | |
|---|---|---|
| JP | 2009-229203 | 10/2009 |
| JP | 2010-60564 | 3/2010 |
| JP | 2011-210156 | 10/2011 |

* cited by examiner

$H_k$: COLOR HISTOGRAM OF EXTRACTED STRUCTURE

(a)

$H_0$: STANDARD HISTOGRAM

(b)

$F_k$: CUMULATIVE DISTRIBUTION

(c)

$F_0$: STANDARD CUMULATIVE DISTRIBUTION (d)

LIFEFORM IMAGE ANALYSIS SYSTEM, LIFEFORM IMAGE ANALYSIS METHOD, AND LIFEFORM IMAGE ANALYSIS PROGRAM

CROSS-REFERENCE TO RELATED PATENT APPLICATIONS

This application is a National Stage Entry of International Application No. PCT/JP2013/000307, filed Jan. 23, 2013, which claims priority from Japanese Patent Application No. 2012-026066, filed Feb. 9, 2012. The entire contents of the above-referenced applications are expressly incorporated herein by reference.

TECHNICAL FIELD

The present invention relates to a lifeform image analysis system, a lifeform image analysis method, and a lifeform image analysis program for analyzing a captured image of a lifeform sample.

BACKGROUND ART

Various methods of making a pathological diagnosis from a captured image (hereafter also referred to as "lifeform image" (biological image)) of a lifeform sample are known. For example, Patent Literature (PTL) 1 describes a method of extracting a gland duct from a lifeform image.

PTL 2 describes an image processing device for correcting a lifeform image depending on an image reading device. The image processing device described in PTL 2 determines the type of lifeform (biological) tissue included in the lifeform image, and corrects the lifeform image depending on the identification information of the image reading device and the type of lifeform tissue.

CITATION LIST

Patent Literatures

PTL 1: Japanese Patent Application Laid-Open No. 2009-229203
PTL 2: Japanese Patent Application Laid-Open No.

SUMMARY OF INVENTION

Technical Problem

A lifeform image could differ in color from another lifeform image, due to differences in image capture device, lifeform sample staining, and the like. There is a problem in that a significant color difference causes lower accuracy of extracting the lifeform tissue from the lifeform image.

The use of the image processing device described in PTL 2 enables absorbing the error of reading performance between image reading devices, and thus improves the lifeform image analysis accuracy. However, even in the case where the same image reading device is used, the same color distribution cannot always be ensured between lifeform images, due to the image capture environment and the staining state. For example, the staining state could be different between different hospitals or different pathology laboratory companies. Even in the same hospital or pathology laboratory company, the daily staining state for the lifeform sample could be different. It is therefore desirable to improve the lifeform image analysis accuracy even in the case where a lifeform image with a different color distribution is included in the analysis object.

In view of this, the present invention has an exemplary object of providing a lifeform image analysis system, a lifeform image analysis method, and a lifeform image analysis program that can improve the lifeform image analysis accuracy even in the case where a lifeform image with a different color distribution is included in the analysis object.

Solution to Problem

A lifeform image analysis system according to the present invention includes: an image input means which inputs a lifeform image which is a captured image of a lifeform sample; a structure standard color storage means which stores a standard color of a structure included in the lifeform image; a structure extraction means which extracts a target structure from the lifeform image; a structure color computation means which computes, from an image of the structure extracted by the structure extraction means, a color of the structure; and a color distribution conversion means which converts a color distribution of the input lifeform image so that a difference between the color of the structure computed by the structure color computation means and the standard color of the corresponding structure stored in the structure standard color storage means is reduced.

A lifeform image analysis method according to the present invention includes: inputting a lifeform image which is a captured image of a lifeform sample; extracting a target structure from the lifeform image; computing, from an image of the extracted structure, a color of the structure; and converting a color distribution of the input lifeform image so that a difference between the computed color of the structure and a standard color of the corresponding structure is reduced.

A lifeform image analysis program according to the present invention causes a computer to execute: an image input process of inputting a lifeform image which is a captured image of a lifeform sample; a structure extraction process of extracting a target structure from the lifeform image; a structure color computation process of computing, from an image of the extracted structure, a color of the structure; and a color distribution conversion process of converting a color distribution of the input lifeform image so that a difference between the computed color of the structure and a standard color of the corresponding structure is reduced.

Advantageous Effects of Invention

According to the present invention, the lifeform image analysis accuracy can be improved even in the case where a lifeform image with a different color distribution is included in the analysis object.

DESCRIPTION OF EMBODIMENTS

The following describes exemplary embodiments of the present invention with reference to drawings.

Exemplary Embodiment 1

Figure 1:
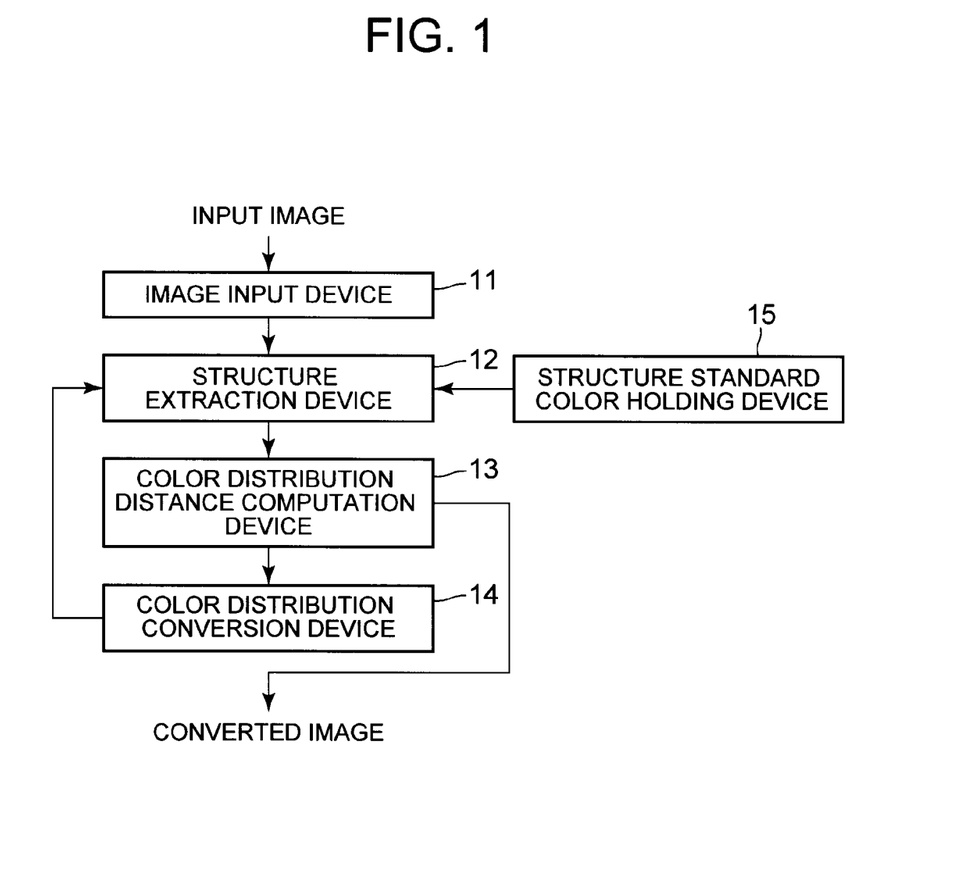
FIG. 1 It depicts a block diagram depicting a configuration example of Exemplary Embodiment 1 of a lifeform image analysis system according to the present invention.

FIG. 1 is a block diagram depicting a configuration example of Exemplary Embodiment 1 of a lifeform image analysis system according to the present invention. The lifeform image analysis system in this exemplary embodiment includes an image input device 11, a structure extraction device 12, a color distribution distance computation device 13, a color distribution conversion device 14, and a structure standard color holding device 15.

The image input device 11 inputs a captured image (lifeform image) of a lifeform sample. In the following description, the lifeform image is also referred to as "pathological image". For example, the image input device 11 may be an input device such as a keyboard for receiving a user's input. Alternatively, the image input device 11 may be a storage device such as a magnetic disk for storing the lifeform image beforehand. In the case of receiving the lifeform image from another device (not depicted) via a communication network, the image input device 11 may be realized by a network interface or the like.

The structure standard color holding device 15 stores a standard color of a structure included in the lifeform image. In the present invention, the term "structure" includes the structure included in the lifeform image and a predetermined region specified by the structure, and the term "color of the structure" means a color representing the structure and the predetermined region specified by the structure. The standard color is expressed in, for example, an RGB system. Note that the method of expressing the standard color is not limited to the RGB system, and the standard color may be expressed by any other method that allows comparison with the color of the input image.

For example, the standard color of each structure is learned based on the structure included in images captured by a typically used scanner or the like, and stored in the structure standard color holding device 15 beforehand. In the case where the standard color is expressed in the RGB system, for instance, a normal color $C_0=[R_0, G_0, B_0]$ and a standard deviation $\sigma_0=[\sigma_{0r}, \sigma_{0g}, \sigma_{0b}]$ of the structure are set as the standard color in the structure standard color holding device 15 beforehand. An example of the normal color $C_0$ is an average value of colors in the region of the structure.

Note that the information indicating the standard color is not limited to the average value and the standard deviation, and the standard color may be indicated by any other information representing the feature of the color of the structure.

A range D of color determined as the normal color is also set in the structure standard color holding device 15. For example, whether or not a color $C=[R, G, B]$ is within the range of the normal color $C_0=[R_0, G_0, B_0]$ can be determined using a distance d computed according to the following Expression 1. The structure standard color holding device 15 may store the distance d of the color determined as the normal color, as the range D. The structure standard color holding device 15 is realized by, for example, a magnetic disk or the like.

$$d=[(R_0-R)^2+(G_0-G)^2+(B_0-B)^2]^{1/2} \quad \text{(Expression 1)}.$$

The structure extraction device 12 extracts a target structure from the lifeform image. In detail, the structure extraction device 12 specifies in which part of the lifeform image and in which shape, color, and size the target structure is present. Examples of the structure included in the lifeform image include: a lifeform tissue such as stroma, lymphocyte, erythrocyte, histiocyte, gland duct, blood vessel, adipocyte, or fibroblast; and a background outside a tissue. A background outside a tissue is typically displayed in white color. The structure extraction device 12 performs image processing corresponding to such a target structure, to extract the structure from the lifeform image.

For example, the structure extraction device 12 extracts the structure using image processing such as pattern matching. Here, the structure extraction device 12 determines whether or not the color of the part to be extracted is within the range of the standard color and, in the case where the color is within the range of the standard color, extracts the part as the target structure. As an example, the structure extraction device 12 may determine whether or not the color is within the range of the standard color, based on whether or not the distance d computed according to Expression 1 shown above is included in the range D of color determined as the standard color.

The color distribution distance computation device 13 computes, from the structure extracted by the structure extraction device 12, the color of the structure. In detail, the color distribution distance computation device 13 computes, from the picture elements (hereafter also referred to as "pixels") included in the region of the structure extracted by the structure extraction device 12, an average color $C_k$ and a standard deviation $\sigma_k$ as the color of the structure. Note that the information computed by the color distribution distance computation device 13 is not limited to the average color $C_k$ and the standard deviation $\sigma_k$. The color distribution distance computation device 13 may compute other information as the color of the structure, so long as the information can indicate the difference from the above-mentioned standard color.

The color distribution conversion device 14 converts the color distribution of the input lifeform image so that the difference between the color of the target structure computed by the color distribution distance computation device 13 and the standard color of the corresponding structure stored in the structure standard color holding device 15 is reduced.

For example, the color distribution conversion device 14 may convert the color distribution of the lifeform image so that the average color and the standard deviation in the region of the structure extracted by the structure extraction device 12 respectively match the normal color $C_0$ and the standard deviation $\sigma_0$ of the structure stored in the structure standard color holding device 15. In this case, the process of converting the color distribution is represented by, for example, the following Expression 2.

$$X'=\sigma_0(X-\mu)/\sigma+\mu_0 \quad \text{(Expression 2)}.$$

In Expression 2, X is the current RGB value of a pixel, and X' is the converted RGB value of the pixel. $\mu$ (=[R, G, B]) is the average value of the current RGB value, and $\mu_0$ (=[$R_0$, $G_0$, $B_0$]) is the average value of the desired RGB value. $\sigma$ (=[$\sigma_r$, $\sigma_g$, $\sigma_b$]) is the standard deviation of the current RGB value, and $\sigma_0$ (=[$\sigma_{0r}$, $\sigma_{0g}$, $\sigma_{0b}$]) is the standard deviation of the desired RGB value. The color distribution conversion device 14 may perform the conversion process using Expression 2 shown above as an example, on each value of R, G, and B indicated by each pixel in the lifeform image. For example, when the R value of the i-th pixel is denoted by $r_i$, the converted value $r_i'$ is computed according to the following Expression 3.

$$r_i'=\sigma_{0r}(r_i-R)/\sigma_r+R_0 \quad \text{(Expression 3)}.$$

As an alternative, the color distribution conversion device 14 may convert the color distribution of the lifeform image so that the color distribution (histogram) in the region of the structure extracted by the structure extraction device 12 matches the histogram of the standard color of the structure. In this case, the structure standard color holding device 15 holds the histogram of the standard color, instead of the normal color and the standard deviation of the structure.

Figure 2:
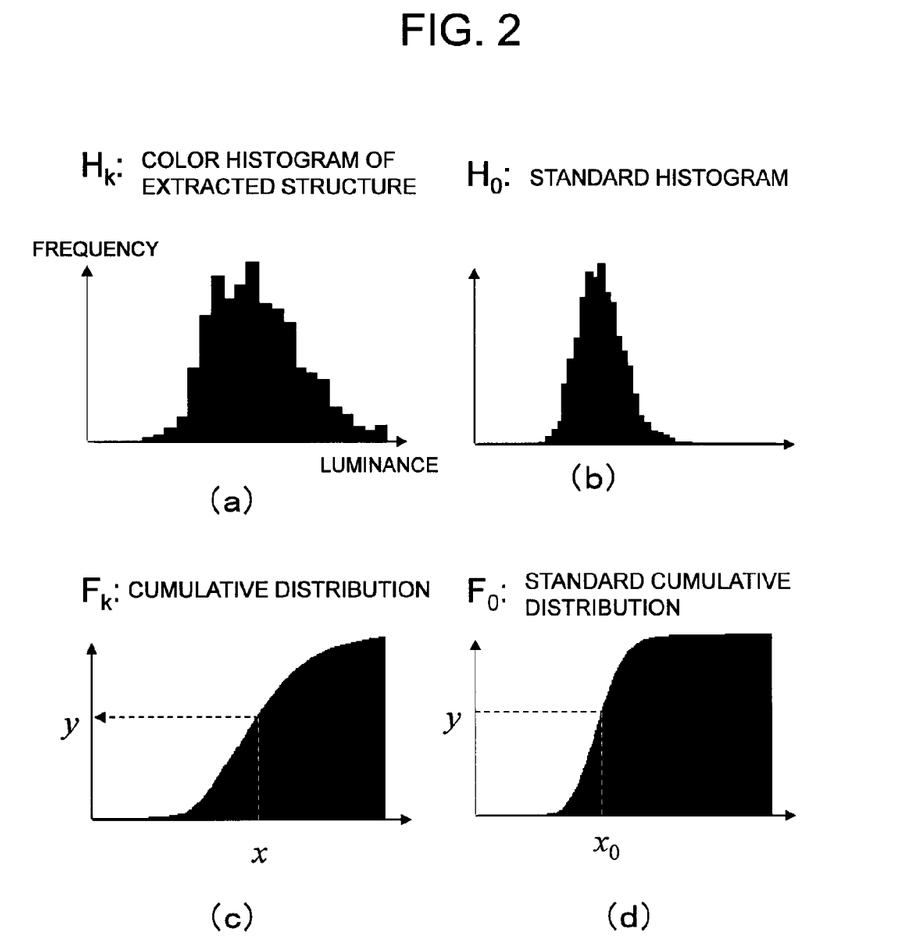
FIG. 2 It depicts an explanatory diagram depicting an example of a histogram matching method.

An example of the histogram matching method is described below. FIG. 2 is an explanatory diagram depicting an example of the histogram matching method. Suppose the structure standard color holding device 15 stores a one-dimensional histogram for each of R, G, and B. This histogram (hereafter referred to as "standard histogram $H_0$") is given beforehand (see (b) in FIG. 2).

First, the color distribution conversion device 14 computes a color histogram $H_k$ of the pixels included in the extracted structure, for the luminance of each of R, G, and B (see (a) in FIG. 2). The color distribution conversion device 14 converts the computed color histogram $H_k$ to a cumulative distribution (cumulative histogram), and computes the corresponding luminance.

(c) in FIG. 2 depicts an example of a cumulative distribution $F_k$ obtained by converting the current color histogram, and (d) in FIG. 2 depicts an example of a standard cumulative distribution $F_0$ obtained by converting the standard histogram. For example, suppose a pixel value x in the currently acquired structure corresponds to a cumulative number y in the cumulative distribution $F_k$ in (c) in FIG. 2. Also suppose the pixel value of the cumulative number y is $x_0$ in the standard cumulative distribution $F_0$ in (d) in FIG. 2. In this case, the pixel value x in the currently acquired structure corresponds to $x_0$ in the standard histogram. The color distribution conversion device 14 accordingly converts the pixel value x in the currently acquired structure to $x_0$.

The above-mentioned conversion process can be represented by, for example, the following Expression 4.

$$y=F_k(x)$$

$$x_0=F^{-1}{}_0(y) \quad \text{(Expression 4)}.$$

In Expression 4, $F^{-1}{}_0$ is an inverse function of the standard cumulative distribution.

The color distribution conversion device 14 inputs the converted lifeform image to the structure extraction device 12. The structure extraction device 12 again extracts the target structure from the converted lifeform image.

The color distribution distance computation device 13 determines whether or not the difference between the color of the structure extracted from the image before the conversion and the color of the structure extracted from the converted image is within a predetermined threshold $\epsilon$.

As an example, in the case where the color distribution conversion process is performed so that the average value and the standard deviation match the standard color, the color distribution distance computation device 13 may compute the distance d using the above-mentioned Expression 1 as the difference between the colors, and determine whether or not the distance is within the predetermined threshold $\epsilon$.

As another example, in the case where the color distribution conversion process is performed so that the histogram matches the standard color, the color distribution distance computation device 13 may compute the distance d between the distributions as the difference between the colors, and determine whether or not the distance is within the predetermined threshold $\epsilon$. For instance, the Kullback-Leibler divergence computed according to the following Expression 5, the total variation distance computed according to the following Expression 6, or the Hellinger distance computed according to the following Expression 7 is available as the distance d between the distributions.

$$d = \sum_{i=0}^{255} p_0(x_i)\log[p_0(x_i)/p(x_i)] \quad \text{(Expression 5)}$$

$$d = \sum_{i=0}^{255} |p_0(x_i) - p(x_i)| \quad \text{(Expression 6)}$$

$$d = \frac{1}{2}\sum_{i=0}^{255} \left[\sqrt{p_0(x_i)} - \sqrt{p(x_i)}\right]^2 \quad \text{(Expression 7)}$$

In Expressions 5, 6, and 7, $p_0(x)$ and $p(x)$ each denote a frequency of normalizing the value x. In the case where the difference between the colors computed by the above-mentioned method exceeds the predetermined threshold $\epsilon$, the color distribution conversion device 14 again performs the color distribution conversion process on the converted image.

In the case where the color of the structure changes, it is assumed that there is a change in the extracted structure. Therefore, by converting the color distribution based on the newly computed color of the structure, the lifeform image can be more appropriately converted and thus the lifeform image analysis accuracy can be improved.

The color distribution conversion process is performed on the whole lifeform image. In the case where the original lifeform image is large, however, sequentially performing the color conversion process on all pixels could require a lot of time. Hence, the color distribution conversion device 14 may perform the color distribution conversion process on a part of the lifeform image.

In this case, the color distribution conversion device 14 may compute a conversion parameter based on the conversion process performed on a partial region of the image and, in the case of determining that the image has been converted to an image with a normal color distribution, apply the computed conversion parameter to the whole lifeform image.

In detail, the structure extraction device 12 extracts the target structure from a part of the lifeform image specified by a predetermined position and size. After the color distribution distance computation device 13 computes the color of the extracted structure, the color distribution conversion device 14 converts the color distribution of the part of the lifeform image so that the difference between the color of the structure and the standard color is reduced. In the case where the change of the converted color distribution is less than a predetermined criterion, the color distribution conversion device 14 converts the color distribution of the whole lifeform image. The color distribution conversion device 14 may use, for example, the above-mentioned threshold $\epsilon$ as the criterion for the change of the color distribution.

That is, the color distribution conversion device 14 may end the conversion process on the part of the lifeform image in the case where there is no more significant change of the color distribution, and convert the color distribution of the whole lifeform image. The time required for the conversion process can be reduced in this way.

The structure extraction device 12, the color distribution distance computation device 13, and the color distribution conversion device 14 are realized by a CPU of a computer operating according to a program (lifeform image analysis program). For instance, the program may be stored in a storage unit (not depicted) in each device, with the CPU (Central Processing Unit) reading the program and, according to the program, operating as the structure extraction device 12, the color distribution distance computation device 13, and the color distribution conversion device 14.

Alternatively, the structure extraction device 12, the color distribution distance computation device 13, and the color distribution conversion device 14 may each be realized by dedicated hardware, as in the lifeform image analysis system in this exemplary embodiment. The structure extraction device 12, the color distribution distance computation device 13, and the color distribution conversion device 14 may be realized as one device.

Figure 3:
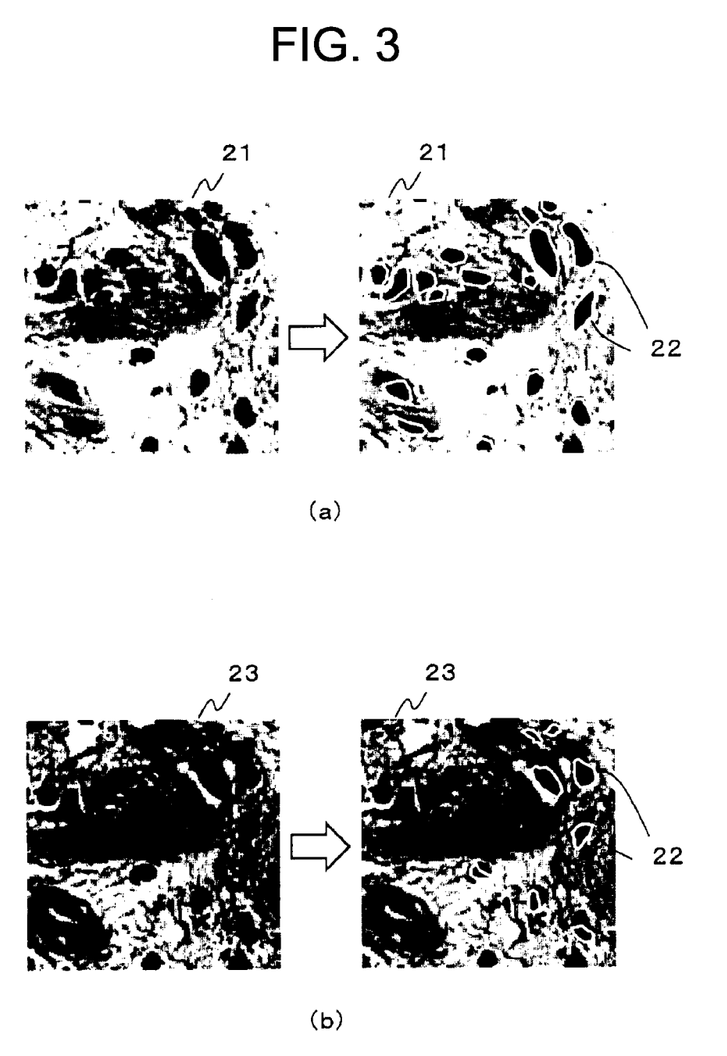
FIG. 3 It depicts an explanatory diagram depicting an example of a pathological image to be analyzed and an extracted structure.

The following describes the operation of the lifeform image analysis system in this exemplary embodiment, using a specific example. FIG. 3 is an explanatory diagram depicting an example of the pathological image to be analyzed and the extracted structure. A pathological image 21 depicted in (a) in FIG. 3 as an example is an image captured by the typically used scanner. In this case, a structure of nuclei 22 is appropriately extracted using a standard parameter learned beforehand.

On the other hand, a pathological image 23 depicted in (b) in FIG. 3 as an example is an image captured by a scanner different from the typically used scanner. In this case, the pathological image is captured with a color distribution different from that of the typically captured image, due to scanner performance and the like. It is therefore difficult to appropriately extract the structure of the nuclei 22 using the standard parameter learned beforehand. A process of enabling extraction of the nuclei 22 depicted in (a) in FIG. 3 as an example from the pathological image depicted in (b) in FIG. 3 as an example is described below.

Figure 4:
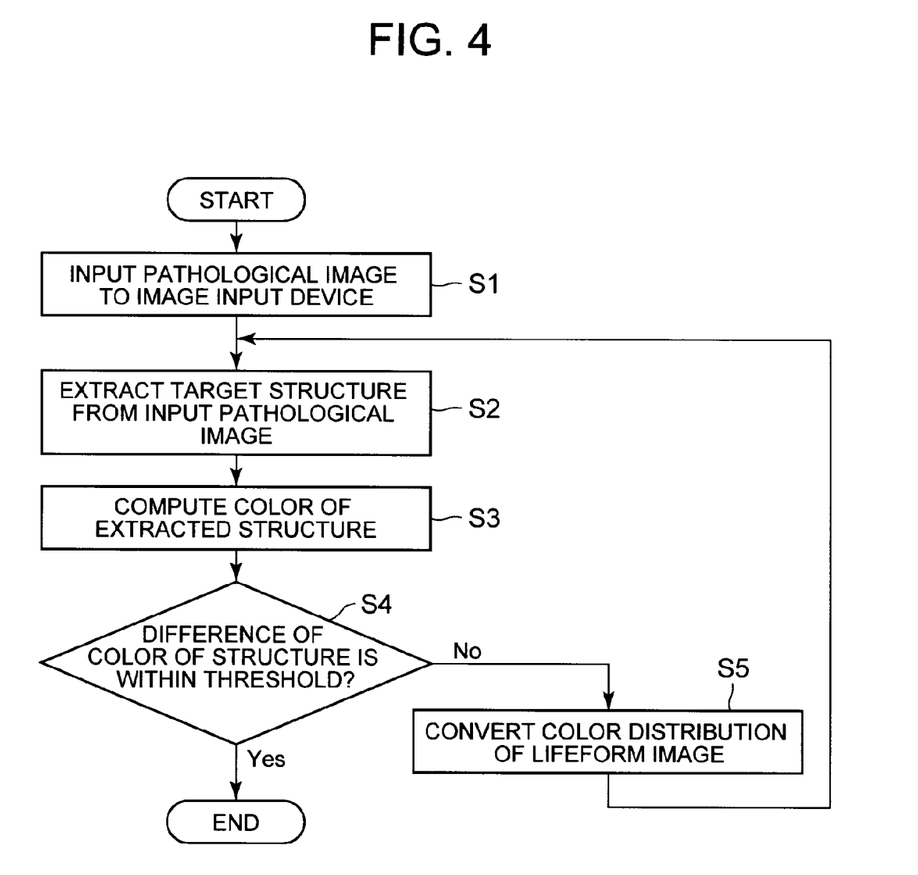
FIG. 4 It depicts a flowchart depicting an operation example of the lifeform image analysis system.
Figure 5:
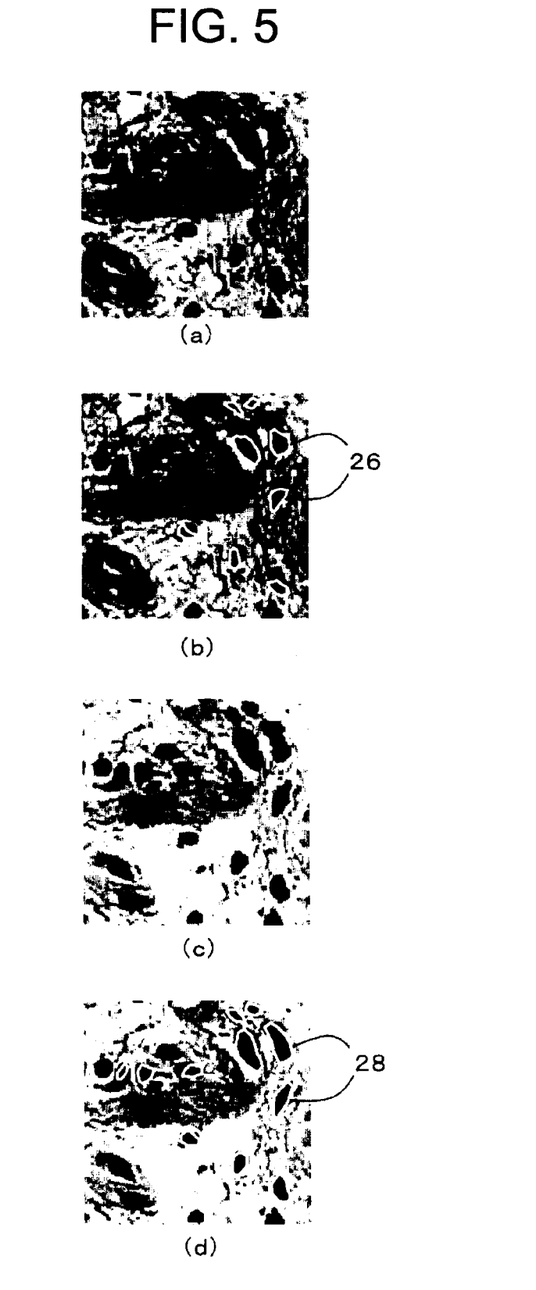
FIG. 5 It depicts an explanatory diagram depicting another example of the pathological image to be analyzed and the extracted structure.

FIG. 4 is a flowchart depicting an operation example of the lifeform image analysis system in this exemplary embodiment. FIG. 5 is an explanatory diagram depicting another example of the pathological image to be analyzed and the extracted structure. The following describes the case of extracting the nuclei in the pathological image as the structure, though the structure to be extracted is not limited to the nuclei.

First, the pathological image depicted in (a) in FIG. 5 as an example is input to the image input device 11 (step S1 in FIG. 4). The structure extraction device 12 extracts the target structure (the nuclei in this example) from the input pathological image (step S2). For instance, nuclei 26 depicted in (b) in FIG. 5 as an example are extracted.

The color distribution distance computation device 13 computes the color of the extracted structure (step S3). For example, the color distribution distance computation device 13 computes an average color and a standard deviation from colors in the region of the extracted nuclei 26. The color distribution distance computation device 13 may compute a color histogram in the region of the extracted nuclei 26.

The color distribution distance computation device 13 determines whether or not the difference between the color of the structure extracted from the image before the conversion and the color of the structure extracted from the converted image is within the predetermined threshold $\epsilon$ (step S4).

In the case where the difference between the colors exceeds the predetermined threshold $\epsilon$ (No in step S4), the color distribution conversion device 14 converts the color distribution of the pathological image so that the difference between the color computed from the target structure and the standard color is reduced (step S5). Suppose the color distribution of the pathological image is converted as depicted in (c) in FIG. 5 as an example. The lifeform image analysis system then repeats the process from step S2, for the pathological image whose color distribution has been converted.

In detail, the structure extraction device 12 again extracts the target structure (the nuclei in this example) from the pathological image whose color distribution has been converted (step S2). Since the color distribution has been converted, for instance, nuclei 28 depicted in (d) in FIG. 5 as an example are extracted. As is clear from the comparison between (b) and (d) in FIG. 5, the target structure can be more appropriately extracted from the converted pathological image.

After this, the color distribution distance computation device 13 computes the color of the structure extracted from the converted pathological image (step S3), and determines whether or not the difference between the color of the structure extracted from the image before the conversion and the color of the structure extracted from the converted image is within the predetermined threshold $\epsilon$ (step S4). In the case where the difference between the colors is within the predetermined threshold $\epsilon$ (Yes in step S4), the color distribution distance computation device 13 ends the process, and outputs the lifeform image whose color distribution has been converted.

As described above, according to this exemplary embodiment, the structure extraction device 12 extracts the target structure from the lifeform image, and the color distribution distance computation device 13 computes the color of the extracted structure. The color distribution conversion device 14 then converts the color distribution of the lifeform image so that the difference between the computed color of the structure and the standard color is reduced. The lifeform image analysis accuracy can thus be improved even in the case where a lifeform image with a different color distribution is included in the analysis object.

Figure 6:
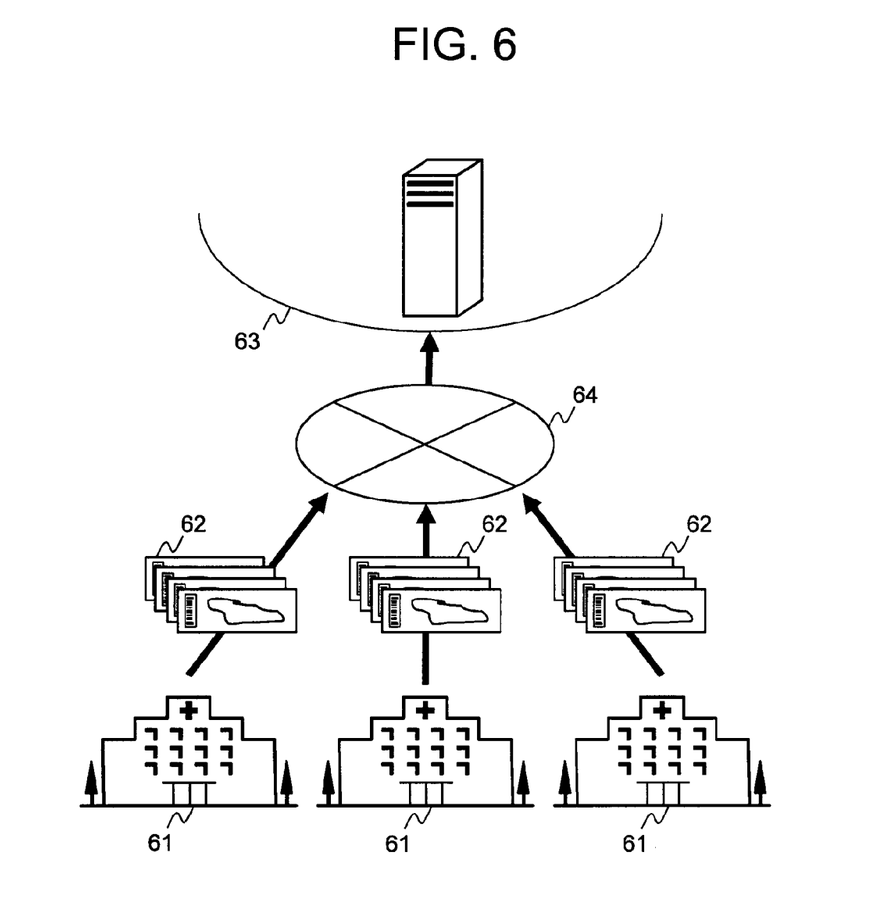
FIG. 6 It depicts an explanatory diagram depicting an example of a system for analyzing lifeform images captured in a plurality of facilities.

FIG. 6 is an explanatory diagram depicting an example of a system for remotely analyzing lifeform images captured in a plurality of facilities. Specimens 62 (lifeform samples) taken in these facilities 61 could differ in color distribution due to differences in staining, image capture device, and the like, as mentioned earlier. For example, the lifeform image analysis system in this exemplary embodiment is introduced in an analysis center 63. As a result, the difference in color distribution between the lifeform images captured in these facilities can be absorbed in the case where these specimens 62 are transmitted to the analysis center 63 via an Internet network 64.

Given that the structure extraction device 12 extracts the target structure from the lifeform image, for instance, the structure extraction device 12 may output an image obtained by superimposing the extracted structure on the input lifeform image. Such a configuration enhances the visibility of the target structure even in the case where there is a difference in color distribution between slides. This contributes to higher lifeform image analysis accuracy for doctors and the like.

Exemplary Embodiment 2

Figure 7:
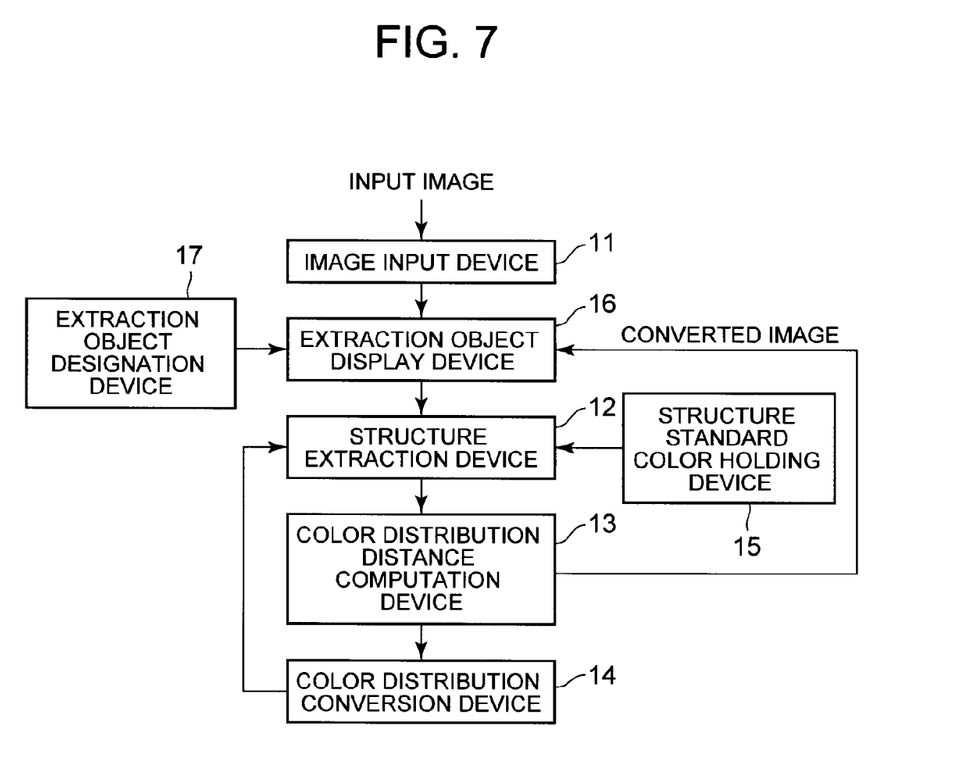
FIG. 7 It depicts a block diagram depicting a configuration example of Exemplary Embodiment 2 of the lifeform image analysis system according to the present invention.

FIG. 7 is a block diagram depicting a configuration example of Exemplary Embodiment 2 of the lifeform image analysis system according to the present invention. The lifeform image analysis system in this exemplary embodiment includes the image input device 11, the structure extraction device 12, the color distribution distance computation device 13, the color distribution conversion device 14, the structure standard color holding device 15, an extraction object display device 16, and an extraction object designation device 17.

That is, the lifeform image analysis system in this exemplary embodiment differs from the lifeform image analysis system in Exemplary Embodiment 1 in that the extraction object display device 16 and the extraction object designation device 17 are further included. The same components as those in Exemplary Embodiment 1 are given the same reference signs as in FIG. 1, and their description is omitted.

The extraction object display device 16 displays the lifeform image input to the image input device 11. The extraction object designation device 16 also displays the lifeform image as a result of the color distribution conversion process.

The extraction object designation device 17 receives, for the lifeform image displayed by the extraction object display device 16, the user's designation of the range subjected to the color distribution conversion process and the structure to be extracted, and notifies the extraction object display device 16 of the designation.

In detail, when the lifeform image is input to the image input device 11, the extraction object display device 16 displays the input lifeform image. When the range and the structure to be extracted in the displayed lifeform image are designated by the extraction object designation device 17, the extraction object display device 16 inputs information indicating the designated structure to be extracted and an image of the designated range, to the structure extraction device 12.

The extraction object display device 16 also displays the image of the range in which the color distribution has been converted, together with the lifeform image. Here, the extraction object display device 16 may superimpose the image whose color distribution has been converted on the original lifeform image, or separately display the original lifeform image and the image whose color distribution has been converted. The superimposition of the image whose color distribution has been converted on the original lifeform image by the extraction object display device 16 has an advantageous effect of enhancing the visibility of the size, shape, color distribution, and the like of the structure.

The extraction object designation device 17 is realized by, for example, an input device such as a pointing device. The extraction object display device 16 is realized by, for example, a display device such as a display. The extraction object display device 16 and the extraction object designation device 17 may be integrally formed as an input/output device such as a touch panel.

Figure 8:
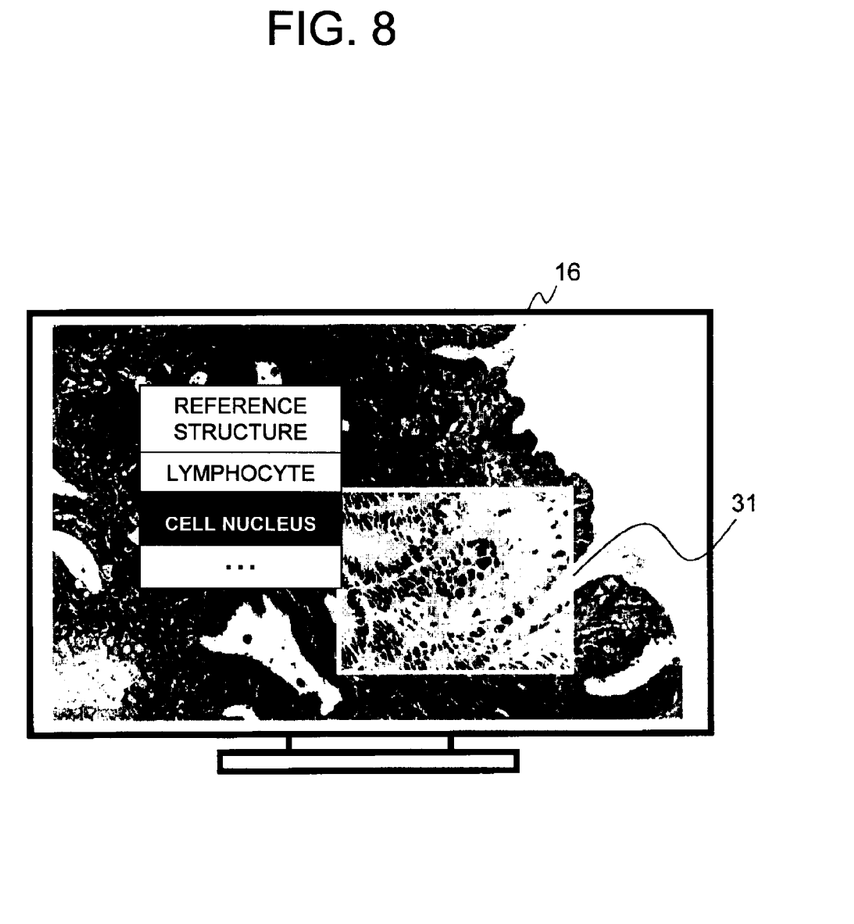
FIG. 8 It depicts an explanatory diagram depicting an example of a lifeform image displayed by an extraction object display device 16.

FIG. 8 is an explanatory diagram depicting an example of the lifeform image displayed by the extraction object display device 16. Suppose the extraction object display device 16 is realized by a display, and the extraction object designation device 17 is realized by a mouse. When the input lifeform image is displayed by the extraction object display device 16, the extraction object designation device 17 receives the user's designation of the extraction object.

For instance, the range of the image is designated by dragging the mouse. After the designation of the range, candidates for the structure to be extracted are displayed by clicking the right mouse button, and the structure to be extracted is designated by selecting the extraction object from the candidates. In the example depicted in FIG. 8, the extraction object display device 16 displays "lymphocyte" and "cell nucleus" as the candidates for the structure to be extracted, and "cell nucleus" is selected from the candidates. The extraction object display device 16 then superimposes an image 31 whose color distribution has been converted, on the original input image.

As described above, according to this exemplary embodiment, the extraction object designation device 17 receives, for the lifeform image, the user's designation of the range of the lifeform image subjected to the color distribution conversion process and the structure to be extracted from the lifeform image. The structure extraction device 12 extracts the designated structure from the lifeform image of the designated range. The extraction object display device 16 displays the converted lifeform image together with the original lifeform image. Thus, the extraction result can be displayed in a more visually understandable manner, in addition to the advantageous effects of Exemplary Embodiment 1.

Figure 9:
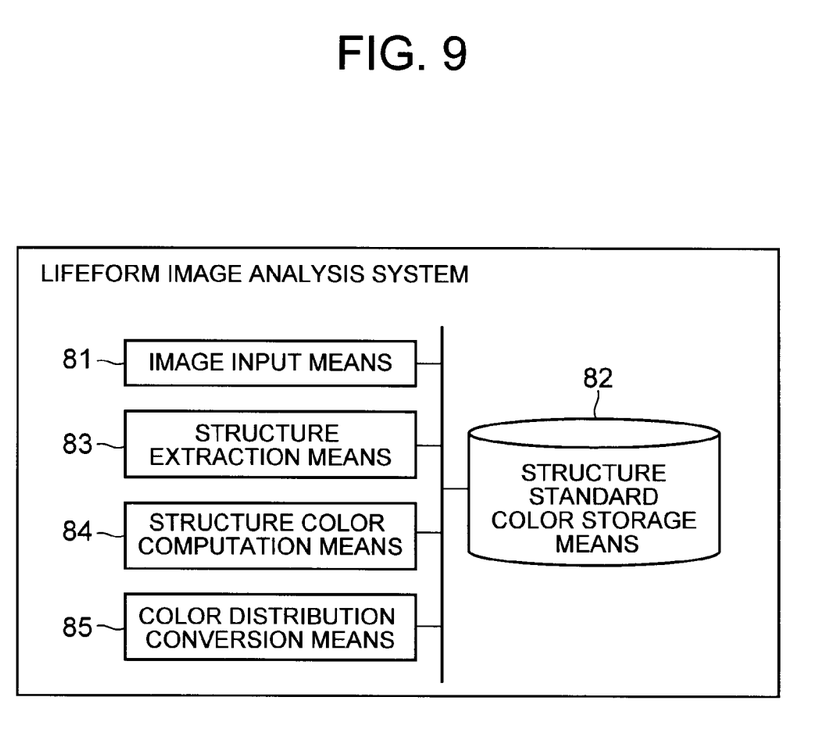
FIG. 9 It depicts a block diagram schematically depicting the lifeform image analysis system according to the present invention.

The following describes the overview of the present invention. FIG. 9 is a block diagram schematically depicting the lifeform image analysis system according to the present invention. The lifeform image analysis system according to the present invention includes: an image input means 81 (e.g. the image input device 11) which inputs a lifeform image which is a captured image of a lifeform sample; a structure standard color storage means 82 (e.g. the structure standard color holding device 15) which stores a standard color (e.g. the normal color $C_0$ and the standard deviation $\sigma_0$ of the structure, the color histogram of the structure) of a structure included in the lifeform image; a structure extraction means 83 (e.g. the structure extraction device 12) which extracts a target structure (e.g. nucleus) from the lifeform image; a structure color computation means 84 (the color distribution distance computation device 13) which computes, from an image of the structure extracted by the structure extraction means 83, a color of the structure; and a color distribution conversion means 85 (e.g. the color distribution conversion device 14) which converts a color distribution of the input lifeform image so that a difference between the color of the structure computed by the structure color computation means 84 and the standard color of the corresponding structure stored in the structure standard color storage means 82 is reduced.

Moreover, the structure extraction means 83 may extract the target structure from the lifeform image whose color distribution has been converted by the color distribution conversion means 85.

With such a configuration, the lifeform image analysis accuracy can be improved even in the case where a lifeform image with a different color distribution is included in the analysis object.

Moreover, the structure color computation means 84 may determine whether or not a difference between the color of the structure extracted from the lifeform image before the conversion by the color distribution conversion means 85 and the color of the structure extracted from the lifeform image converted by the color distribution conversion means 85 is within a predetermined threshold (e.g. the threshold $\epsilon$), and the color distribution conversion means 85 may convert the color distribution of the converted lifeform image, in the case where the difference exceeds the predetermined threshold.

Moreover, the structure extraction means 83 may extract the target structure from a part of the lifeform image, and the color distribution conversion means 85 may convert the color distribution of the part of the lifeform image so that the difference between the color of the structure and the standard color of the corresponding structure is reduced and, in the case where a change of the color distribution is less than a predetermined criterion (e.g. in the case where there is no more significant change of the color distribution), convert the color distribution of the whole lifeform image. With such a configuration, the time required for the conversion process can be reduced.

Moreover, the structure color computation means 84 may compute, from pixels included in a region of the structure extracted by the structure extraction means 83, an average color and a standard deviation as the color of the structure, and the color distribution conversion means 85 may convert the color distribution of the lifeform image so that the average color and the standard deviation match the standard color of the structure.

Moreover, the structure color computation means 84 may compute a histogram of pixels included in a region of the structure extracted by the structure extraction means 83, as the color of the structure, and the color distribution conversion means 85 may convert the color distribution of the lifeform image so that the computed histogram matches the standard color of the structure.

Moreover, the structure standard color storage means 82 may store a range (e.g. the range D) of color determined as the standard color of the structure, and the structure extraction means 83 may extract, in the case where a color of a part to be extracted is within the range, the part as the target structure.

Moreover, the lifeform image analysis system according to the present invention may include: an extraction object designation means (e.g. the extraction object designation device 17) which receives, for the input lifeform image, a designation of a range of the lifeform image subjected to a color distribution conversion process and a designation of a structure to be extracted from the lifeform image; and a display means (e.g. the extraction object display device 16) which displays the lifeform image whose color distribution has been converted, together with the original lifeform image. The structure extraction means 83 may extract the designated structure from the lifeform image of the range designated by the extraction object designation means.

With such a configuration, the extraction result can be displayed in a visually understandable manner.

Though the present invention has been described with reference to the above exemplary embodiments and examples, the present invention is not limited to the above exemplary embodiments and examples. Various changes understandable by those skilled in the art can be made to the structures and details of the present invention within the scope of the present invention.

This application claims priority based on Japanese Patent Application No. 2012-026066 filed on Feb. 9, 2012, the disclosure of which is incorporated herein in its entirety.

INDUSTRIAL APPLICABILITY

The present invention is suitably used for a lifeform image analysis system for analyzing a captured image of a lifeform sample.

REFERENCE SIGNS LIST

11 image input device
12 structure extraction device
13 color distribution distance computation device
14 color distribution conversion device
15 structure standard color holding device
16 extraction object display device
17 extraction object designation device
21, 23 pathological image
22, 26, 28 nuclei

The invention claimed is:

1. A lifeform image analysis system comprising:
a memory storing instructions; and
a processor configured to execute the instructions to:
   receive as input a lifeform image which is a captured image of a lifeform sample;
   store a standard color of a structure included in the lifeform image;
   extract a target structure from the lifeform image;
   compute a color of the extracted structure;
   convert a color of the lifeform image, so that a first difference between the computed color of the extracted structure and the standard color of a corresponding structure is reduced;
   determine whether a second difference between the computed color of the extracted structure before the conversion and a color of the target structure extracted from the converted lifeform image is within a predetermined threshold; and
   convert a color of the converted lifeform image, if it is determined that the second difference exceeds the predetermined threshold.

2. The lifeform image analysis system according to claim 1, wherein the target structure is extracted from the converted lifeform image.

3. The lifeform image analysis system according to claim 1, wherein the target structure is extracted from a first part of the lifeform image, the processor is further configured to execute the instructions to:
   convert a color of the first part of the lifeform image; and
   convert a color of a second part of the lifeform image, if a change of color after converting the color of the first part of the lifeform image is less than a predetermined criterion.

4. The lifeform image analysis system according to claim 1, wherein the processor is further configured to execute the instructions to:
   compute, from pixels included in a region of the extracted structure, an average color and a standard deviation as the color of the extracted structure, and
   convert the color of the lifeform image so that the average color and the standard deviation match the standard color of the corresponding structure.

5. The lifeform image analysis system according to claim 1, wherein the processor is further configured to:
   compute a histogram of pixels included in a region of the extracted structure, as the color of the extracted structure, and
   convert the color of the lifeform image so that the computed histogram matches the standard color of the corresponding structure.

6. The lifeform image analysis system according to claim 1, wherein the processor is further configured to execute the instructions to:
   store a range of color determined as the standard color of the corresponding structure, and
   extract a part of the lifeform image as the target structure, if a color of the part is within the range.

7. The lifeform image analysis system according to claim 1, wherein the processor is further configured to execute the instructions to:
   receive, for the lifeform image, a designation of a range of the lifeform image subjected to a color conversion process, and a designation of a structure to be extracted from the lifeform image;
   display the converted lifeform image, together with an original lifeform image; and
   extract the designated structure from the lifeform image of the designated range.

8. A lifeform image analysis method comprising:
   receiving as input a lifeform image which is a captured image of a lifeform sample;
   extracting a target structure from the lifeform image;
   computing a color of the extracted structure;
   converting a color of the lifeform image, so that a first difference between the computed color of the extracted structure and a standard color of a corresponding structure is reduced;
   determining whether a second difference between the computed color of the extracted structure before the conversion and a color of the target structure extracted from the converted lifeform image is within a predetermined threshold; and
   converting a color of the converted lifeform image, if it is determined that the second difference exceeds the predetermined threshold.

9. The lifeform image analysis method according to claim 8, wherein the target structure is extracted from the converted lifeform image.

10. A non-transitory computer readable information recording medium storing a lifeform image analysis program that, when executed by a processor, performs a method comprising:
    receiving as input a lifeform image which is a captured image of a lifeform sample;
    extracting a target structure from the lifeform image;
    computing a color of the extracted structure;
    converting a color of the lifeform image, so that a first difference between the computed color of the extracted structure and a standard color of a corresponding structure is reduced;
    determining whether or not a second difference between the computed color of the extracted structure before the conversion and a color of the target structure extracted from the converted lifeform image is within a predetermined threshold; and
    converting the color of the converted lifeform image, if it is determined that the second difference exceeds the predetermined threshold.

11. The non-transitory computer readable information recording medium according to claim 10, comprising
    extracting the target structure from the converted lifeform image.

12. The lifeform image analysis system according to claim 2, wherein the target structure is extracted from a first part of the lifeform image, the processor is further configured to:
    convert a color of the first part of the lifeform image; and
    convert a color of a second part of the lifeform image, if a change of color after converting the color of the first part of the lifeform image is less than a predetermined criterion.

13. The lifeform image analysis system according to claim 2, wherein the processor is further configured to:
    receive, for the lifeform image, a designation of a range of the lifeform image subjected to a color conversion process, and a designation of a structure to be extracted from the lifeform image;
    display the converted lifeform image, together with an original lifeform image; and
    extract the designated structure from the lifeform image of the designated range.

* * * * *